United States Patent [19]

Nakashima et al.

[11] Patent Number: 4,557,660
[45] Date of Patent: Dec. 10, 1985

[54] ROBOT HAND

[75] Inventors: Seiichiro Nakashima; Nobutoshi Torii; Masayuki Hamura, all of Tokyo, Japan

[73] Assignee: Fanuc Ltd., Minamitsuru, Japan

[21] Appl. No.: 558,474

[22] Filed: Dec. 6, 1983

[30] Foreign Application Priority Data

Dec. 6, 1982 [JP] Japan .......................... 57-183727[U]

[51] Int. Cl.$^4$ .............................................. B25J 15/02
[52] U.S. Cl. ..................................... 414/730; 901/37; 901/49
[58] Field of Search ................... 901/49, 37, 38; 414/730

[56] References Cited

U.S. PATENT DOCUMENTS 4,336,926 6/1982 Inagaki et al. .................. 901/37
4,348,044 9/1982 Wood .............................. 901/37

FOREIGN PATENT DOCUMENTS 131255 10/1979 Japan ............................. 901/49
WO82/01156 4/1982 PCT Int'l Appl. ............. 901/37

Primary Examiner—Magdalen Y. C. Moy
Attorney, Agent, or Firm—Staas & Halsey

[57] ABSTRACT

A robot hand provided with fingers driven by a double acting cylinder and supplied working liquid pressure through two, 2-position, 5-port-type, single solenoid, electromagnetic valves, wherein: (a) an outlet of a first electromagnetic valve is connected with the inlet thereof in response to the ON position of the solenoid thereof and is connected with the inlet of a first chamber of the double acting cylinder; (b) an outlet of a second electromagnetic valve is connected with the inlet thereof in response to the OFF position of a second chamber of the double acting cylinder; (c) an outlet of the first electromagnetic valve is connected with the inlet thereof in response to the OFF position of the solenoid thereof and is plugged; (d) an outlet of the second electromagnetic valve is connected with the inlet thereof in response to the ON position of the solenoid thereof and is plugged; and (e) a working liquid pressure source is connected with the inlet of the first and second electromagnetic valves. This robot hand is capable of maintaining an object in a held position even in the event of an electric power supply failure.

1 Claim, 5 Drawing Figures

"ON"

"OFF"

ROBOT HAND

FIELD OF THE INVENTION

This invention relates to a robot hand which is a component of an industrial robot and whose function is to grip an object which is handled and/or carried by the industrial robot and, more specifically, to an improvement applicable to a driving means of a robot hand, wherein the fingers are allowed to selectively take, in addition to an open position in which the fingers of the robot are open and a closed position in which the fingers of the robot are closed, an intermediate position or a neutral position in which the fingers of the robot are brought to and maintained at a neutral position which can be arbitrarily selected between the open position and the closed position. The robot hand is driven by a double acting cylinder which is supplied working liquid pressure, e.g., air pressure, oil pressure or the like through two, independent, 2-position, 5-port-type, single solenoid, electromagnetic valves.

BACKGROUND OF THE INVENTION AND PRIOR ART STATEMENT

A hand of an industrial robot requires at least 2 fingers and also requires that the fingers thereof can selectively take three independent positions, namely: (a) an open position in which the fingers are open to prepare for receipt of an object which is handled by the industrial robot; (b) a closed position in which the fingers are closed and firmly grip the object which is handled by the industrial robot; and (c) an intermediate position or a neutral position in which the fingers are brought to and maintained at a neutral position which can be arbitrarily selected between the open position and the closed position. The reason a robot hand is required to take an intermediate position is to enable an industrial robot to be taught to cause the arm thereof to move to a position in which the fingers thereof contact each other at a position approximately corresponding to the center of an object which is handled by the industrial robot, when a robot hand is preliminarily brought to a grip position (a position in which an object is placed to be gripped by a robot hand) prior to commencement of a probably consecutive operation. Incidentally, it is important to note that the fingers stay apart from each other at an intermediate position, albeit the distance between the fingers is adjustable. In other words, there are possibilities in which a sufficient gripping force can not necessarily be expected from the fingers, particularly for an object having a small size, at an intermediate position.

Fingers of a robot hand are preferably driven by a mechanism which comprises a double acting cylinder, of which an example having two fingers is shown in FIG. 1. Referring to FIG. 1, fingers 1 and 1' grip an object 2 which is handled and/or carried by an industrial robot. The fingers 1 and 1' are driven by a link 3 which tilts around a supporting point 3'. The link 3 is driven by a piston 4' which moves up and down in FIG. 1 along the internal surface of a double acting cylinder 4, which is supplied working liquid pressure through a set of two liquid inlets 5 and 5', either of which is selectively connected with a working liquid pressure source (not shown).

A working liquid is preferably supplied to the double acting cylinder 4 through one or more electromagnetic valves, more specifically through two, independent, 2-position, 5-port-type, single solenoid, electromagnetic valves. A 2-position, 5-port-type, single solenoid, electromagnetic valve, of which one example is shown in FIGS. 2(a) and 2(b), is defined as an electromagnetic valve which comprises: (a) an inlet 6 through which a working liquid is supplied to the valve; (b) two outlets 7 and 7' either of which is, in response to the ON or OFF position of the solenoid of the valve, connected with the inlet 6 through a path prepared in the valve; and (c) two purging holes 8 and 8' either of which is connected with one of the outlets 7 and 7' which is not connected to the inlet 6 through a path prepared in the valve, thereby the connection of the liquid paths is switched in response to the ON or OFF position of the solenoid of the valve. It is to be assumed in this specification that a 2-position, 5-port-type, single solenoid, electromagnetic valve has two independent functional positions, either of which is taken in response to the ON or OFF position of a solenoid as respectively shown in FIGS. 2(a) and 2(b), including a first position at which the inlet 6 and the outlet 7 are connected through a path shown by an arrow A and the outlet 7' and the purging hole 8' are connected through a path shown by an arrow B in response to the ON position of the solenoid, and a second position at which the inlet 6 and the outlet 7' are connected through a path shown by an arrow C and the outlet 7 and the purging hole 8 are connected through a path shown by an arrow D in response to the OFF position of the solenoid.

In the prior art, two, independent, 2-position, 5-port-type, single solenoid, electromagnetic valves are connected with a double acting cylinder, as shown in FIG. 3, to constitute a driving means of a robot hand which enables a robot hand to take an intermediate position. Referring to FIG. 3, an inlet 15 of a double acting cylinder 14 is connected with an outlet 17' of a first electromagnetic valve 10, and an inlet 15' of the double acting cylinder 14 is connected with an outlet 27' of a second electromagnetic valve 20. These outlets 17' and 27' of the first and second electromagnetic valves 10 and 20 are connected respectively with an inlet 16 of the first electromagnetic valve 10 and with an inlet 26 of the second electromagnetic valve 20 in response to the OFF position of the solenoid thereof (See FIG. 2(b)). In response to the OFF position of the solenoids of the first and second electromagnetic valves 10 and 20, the inlet 15 of the double acting cylinder 14 is connected with a working liquid pressure source 9 through the outlet 17' and the inlet 16 of the first electromagnetic valve 10, and the inlet 15' of the double acting cylinder 14 is also connected with the working liquid pressure source 9 through the outlet 27' and the inlet 26 of the second electromagnetic valve 20, resultantly supplying working liquid pressure to both chambers of the double acting cylinder 14. In contrast, in response to the ON position of the solenoids of the first and second electromagnetic valves 10 and 20, the outlet 17' is connected with a purging hole 18' and the outlet 27' is connected with a purging hole 28', resultantly reducing the internal pressure of both chambers of the double acting cylinder 14 to zero. The other outlets 17 and 27 are plugged to inhibit the working liquid pressure source 9 from directly being connected with the atmosphere.

The fingers of a robot hand are opened or closed by making the solenoid of one electromagnetic valve ON or OFF and the solenoid of the otherr electromagnetic valve OFF or ON, resultantly driving a piston 14' of the double acting cylinder 14 upward or downward in FIG. 3. In contrast, the fingers are brought to and maintained at an intermediate position by making the solenoids of the both electromagnetic valves 10 and 20 OFF to supply working liquid pressure to both chambers of the double acting cylinder 14, resultantly driving the piston 14' toward the middle part of the double acting cylinder 14 and holding the piston 14' at a location arbitrarily selected between the open and closed positions.

The aforementioned robot hand available in the prior art includes the drawback wherein a termination of electric power supply brings the robot hand to an intermediate position in which the gripping force of the fingers of the robot hand is not necessarily reliable, particularly for a small object, resultantly causing the possibility that the robot hand will fail to keep holding an object, in the event of an electric power failure. In other words, the robot hand available in the prior art does not necessarily satisfy the requirement that the fingers of a robot hand preferably shift to a safer position in response to a termination of electric power supply.

OBJECTS AND SUMMARY OF THE INVENTION

An object of this invention is to provide a robot hand which is driven by a double acting cylinder supplied with a working liquid through two, independent, 2-position, 5-port-type, single solenoid electromagnetic valves, wherein the fingers thereof are caused to close in response to a termination of electric power supply, thereby enabling the robot hand to continue gripping an object held thereby, even in the event of electric power supply failure, resultantly removing the possibility that the robot hand will fail to keep holding the object, in the event of an electric power failure, regardless of the size of the object.

To achieve the aforementioned object, a robot hand in accordance with this invention is provided with at least two fingers which are driven by a double acting cylinder supplied with a working liquid through two, independent, 2-position, 5-port-type, single solenoid, electromagnetic valves, wherein: (a) an outlet of a first electromagnetic valve is connected with the inlet thereof in response to the ON position of the solenoid thereof and is connected with the inlet of the one chamber of the double acting cylinder; (b) an outlet of a second electromagnetic valve is connected with the inlet thereof in response to the OFF position of the other chamber of the double acting cylinder; (c) an outlet of the first electromagnetic valve is connected with the inlet thereof in response to the OFF position of the solenoid thereof and is plugged; (d) an outlet of the second electromagnetic valve is connected with the inlet thereof in response to the ON position of the solenoid thereof and is plugged; and (e) a working liquid pressure source is connected with the inlet of the first and second electromagnetic valves.

The aforementioned robot hand in accordance with this invention can be specified as follows:

A robot hand which is provided with:
(a) a plurality of fingers;
(b) a double acting cylinder which drives the plurality of fingers;
(c) a first, 2-position, 5-port-type, single solenoid, electromagnetic valve, an outlet of which is connected with the inlet thereof in response to the ON position of the solenoid thereof and is connected with the inlet of the one chamber of the double acting cylinder, the inlet of which is connected with a working liquid pressure source, and an outlet of which is connected with the inlet thereof in response to the OFF position of the solenoid thereof and is plugged; and (d) a second, 2-position, 5-port-type, single solenoid, electromagnetic valve, an outlet of which is connected with the inlet thereof in response to the OFF position of the solenoid thereof and is connected with the inlet of the other chamber of the double acting cylinder, the inlet of which is connected with a working liquid pressure source, and an outlet of which is connected with the inlet thereof in response to the ON position of the solenoid thereof and is plugged.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENTS

Described below is a robot hand in accordance with a preferred embodiment of this invention.

Figure 1:
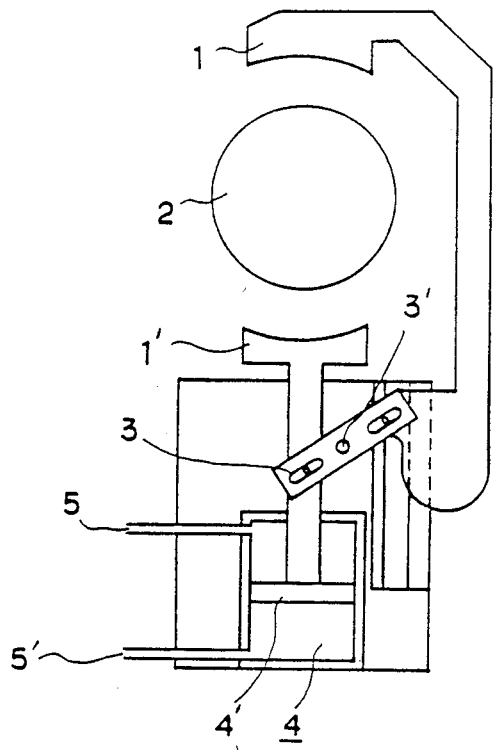
FIG. 1 is a schematic view of a conventional robot hand which has two fingers driven by a double acting cylinder.
Figure 2A:
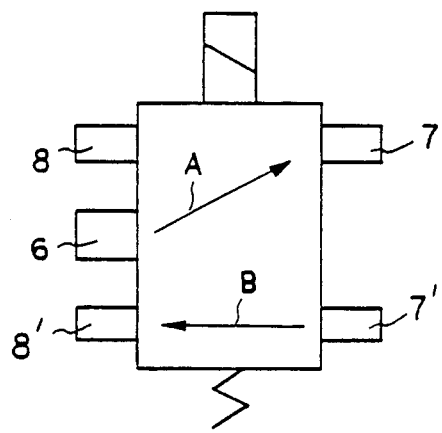
FIGS. 2(a) and 2(b) are schematic views of a conventional, 2-position, 5-port-type, single solenoid, electromagnetic valve, showing the functional positions thereof taken in response to the ON and OFF positions of the solenoid, respectively.
Figure 2B:
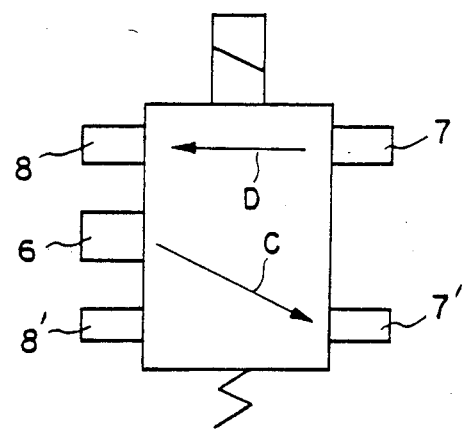
Figure 3:
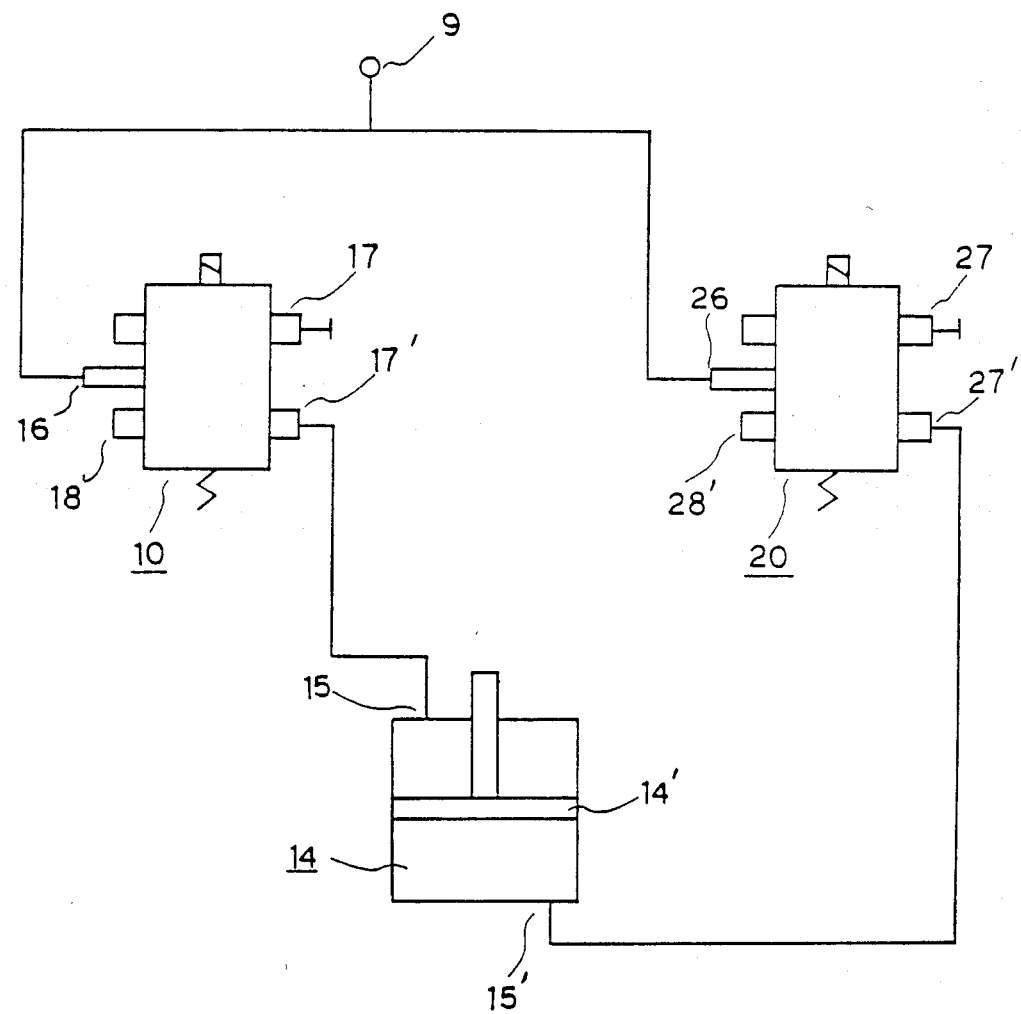
FIG. 3 is a schematic view showing the interconnection among a working liquid pressure source; two, independent, 2-position, 5-port-type, single solenoid, electromagnetic valves; and a double acting cylinder, which together constitute conventional driving means for a robot hand.
Figure 4:
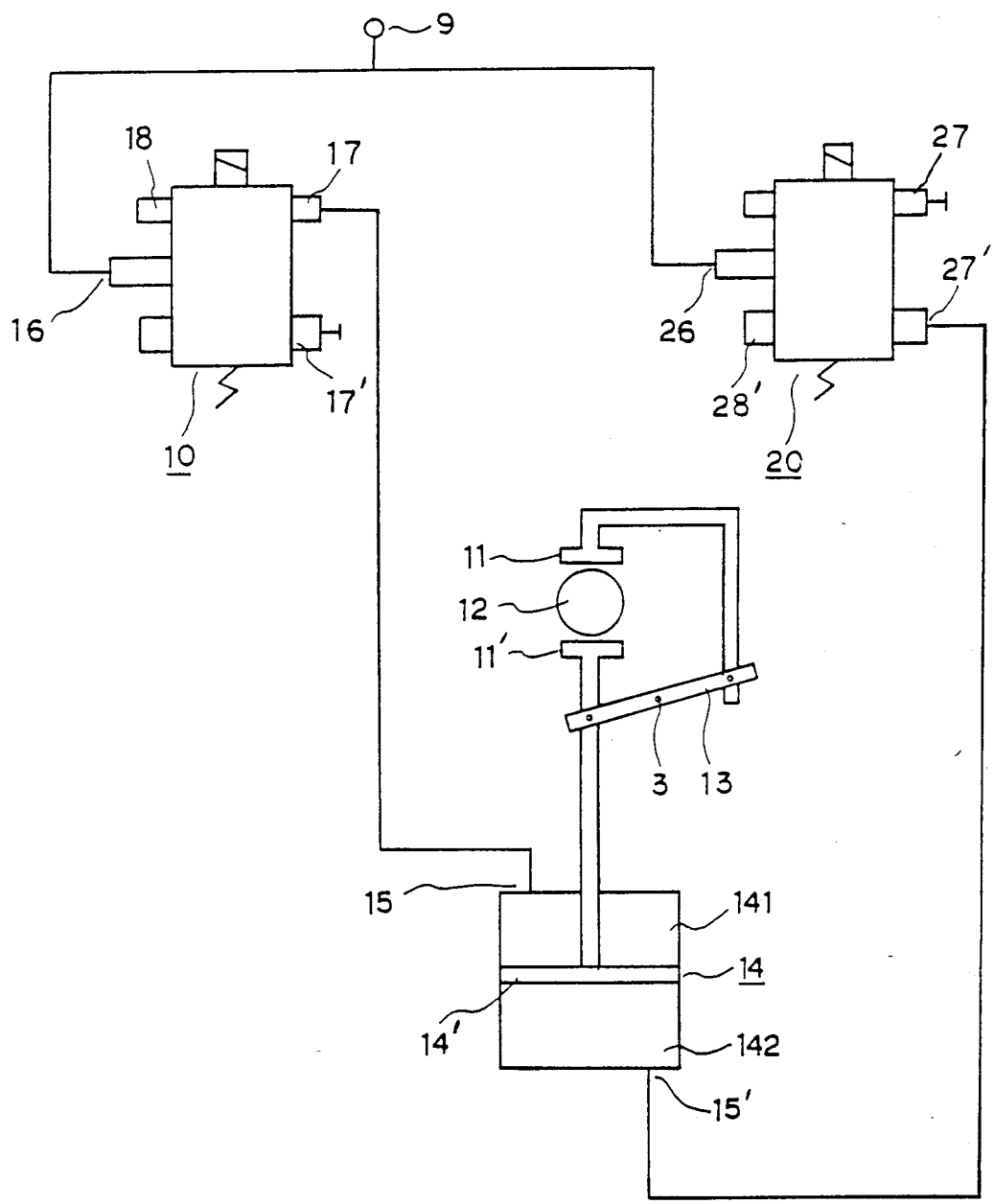
FIG. 4 is a schematic view of a robot hand which has two fingers driven by a double acting cylinder to which working liquid pressure is supplied through two, independent, 2-position, 5-port-type, single solenoid, electromagnetic valves in accordance with one embodiment of this invention, particularly illustrating the interconnection among a working liquid pressure source; the two, 2-position, 5-port-type, single solenoid, electromagnetic valves; and the double acting cylinder, which together constitute a driving means therefor.

Referring to FIG. 4, a working liquid pressure source 9 is connected with the inlet 16 of a first, 2-position, 5-port-type, single solenoid, electromagnetic valve 10 and also with the inlet 26 of a second, 2-position, 5-port-type, single solenoid, electromagnetic valve 20. The inlet 16 is connected with an outlet 17 in response to the ON position of the solenoid of the first electromagnetic valve 10, and the inlet 26 is connected with an outlet 27 in response to the ON position of the solenoid of the second electromagnetic valve 20.

In contrast, the inlet 16 is connected with an outlet 17' in response to the OFF position of the solenoid of the first electromagnetic valve 10, and the inlet 26 is connected with an outlet 27' in response to the OFF position of the solenoid of the second electromagnetic valve 20. On the other hand, the outlet 17 is connected with a purging hole 18 in response to the OFF position of the first electromagnetic valve 10 and the outlet 27' is connected with a purging hole 28' in response to the ON position of the second electromagnetic valve 20. A first chamber 141 of the double acting cylinder 14 is connected with the outlet 17 of the first electromagnetic valve 10 through an inlet 15 of the double acting cylinder 14, and a second chamber 142 of the double acting cylinder 14 is connected with the outlet 27' of the second electromagnetic valve 20 through an inlet 15' of the double acting cylinder 14. This structure allows a piston 14' of the double acting cylinder 14 to be moved by operation of the solenoids of the aforementioned electromagnetic valves. The motion of the piston 14' in the double acting cylinder 14 is transmitted through a link 13 to open or close the fingers 11 and 11', resultantly allowing the robot hand to grip or release an object 12.

The following table shows the function of the robot hand having the aforementioned structure.

| Position of 1st valve | Position of 2nd valve | Movement of piston | Position of fingers |
|---|---|---|---|
| OFF | OFF | Upward | Closed |
| ON | ON | Downward | Open |
| ON | OFF | Stays at a position arbitrarily selected between the 2 ends | Intermediate |

In the event that the supply of electromagnetic power is terminated, both electromagnetic valves 10 and 20 are brought to the OFF position. Thus, the fingers 11 and 11' are brought to a closed position. Accordingly, in the event of an electric power failure, the robot hand is allowed to keep holding an object, regardless of the size of the object.

In other words, a robot hand in accordance with this invention shifts the fingers to a safer position in response to a termination of electric power supply, resultantly satisfying a very fundamental requirement in terms of safety protection.

The foregoing description has clarified that the object of this invention is successfully achieved.

Although this invention has been described with reference to a specific embodiment, this description is not meant to be construed in a limiting sense. Various modifications of the described embodiment, as well as other embodiments of this invention, will become apparent to persons skilled in the art upon reference to the description of this invention. It is therefore contemplated that the appended claims will cover any such modifications or embodiments as fall within the true scope of this invention.

What is claimed is:

1. A robot hand, comprising:
   (a) a plurality of fingers;
   (b) a double acting cylinder which drives said plurality of fingers;
   (c) a first, 2-position, 5-port-type, single solenoid, electromagnetic valve, including—
      (i) a first outlet which is connected with an inlet of the first valve in response to an ON position of the solenoid of the first valve and which is connected with an inlet of a first chamber of said double acting cylinder, the inlet of the first valve being connected with a working liquid pressure source, and
      (ii) a second outlet which is connected with the inlet of the first valve in response to an OFF position of the solenoid and which is plugged; and
   (d) a second, 2-position, 5-port-type, single solenoid, electromagnetic valve, including—
      (i) a first outlet which is connected with an inlet of the second valve in response to an OFF position of the solenoid of the second valve and which is connected with an inlet of a second chamber of said double acting cylinder, the inlet of the second valve being connected with the working liquid pressure source, and
      (ii) a second outlet which is connected with the first inlet of the second valve in response to an ON position of the solenoid of the second valve and which is plugged.

* * * * *